United States Patent

Spoerre

[11] Patent Number: 5,413,317
[45] Date of Patent: May 9, 1995

[54] DAMPING DEVICE

[75] Inventor: Steven M. Spoerre, Holland, Mich.

[73] Assignee: Prince Corporation, Holland, Mich.

[21] Appl. No.: 51,165

[22] Filed: Apr. 22, 1993

[51] Int. Cl.[6] .................... F16F 1/00; B60N 3/12
[52] U.S. Cl. .................... 267/134; 267/153;
188/83; 296/37.8; 16/341 X; 49/381
[58] Field of Search ............ 188/68, 83, 80, 381;
267/153, 141, 201, 134; 296/37.7, 37.8; 16/337,
341; 49/381, 138; 160/206

[56] References Cited

U.S. PATENT DOCUMENTS

| 1,851,571 | 3/1932 | Doman | 188/83 X |
| 1,905,858 | 4/1933 | Hamilton . | |
| 1,965,406 | 7/1934 | Caldwell et al. | 188/83 X |
| 2,815,528 | 12/1957 | Murray | 16/140 |
| 3,156,324 | 11/1964 | Colbert | 188/83 X |
| 3,888,386 | 6/1975 | Svensson | 220/335 |
| 4,595,228 | 6/1986 | Chu | 296/37.7 |
| 4,785,500 | 11/1988 | Langridge | 16/341 X |
| 4,794,669 | 1/1989 | Sanders | 16/341 |
| 5,039,153 | 8/1991 | Lindberg et al. | 16/341 X |
| 5,050,922 | 9/1991 | Falcoff | 296/37.8 |
| 5,109,573 | 5/1992 | Sherman | 16/341 |
| 5,178,481 | 1/1993 | Kawamura | 16/341 X |

FOREIGN PATENT DOCUMENTS 419858 1/1911 France .................... 188/381

OTHER PUBLICATIONS

U.S. patent application Ser. No. 07/840,340 filed on Feb. 24, 1992 and entitled Temperature Compensated Rotary Damper.

Primary Examiner—Robert J. Oberleitner
Assistant Examiner—Peter M. Poon
Attorney, Agent, or Firm—Price Heneveld Cooper DeWitt & Litton

[57] ABSTRACT

A damper for controlling the movement of a first member with respect to a second member including an arcuate surface on one of the members which engages the outer peripheral rim of an annular damping member rotatably mounted to the other member. The annular damping member preferably is made of a compressible material, and in one embodiment is made of an open-celled urethane foam. The annular damping member is mounted on an axle positioned to locate the annular damping member in compressible engagement with the arcuate surface such that the arcuate surface engages the outer peripheral rim of the annular damping member as the two members move with respect to one another to provide a controlled damping action for the first member peripheral rim engaging the arcuate surface with a predetermined force to provide a controlled resistance force to the movement of the door.

11 Claims, 2 Drawing Sheets

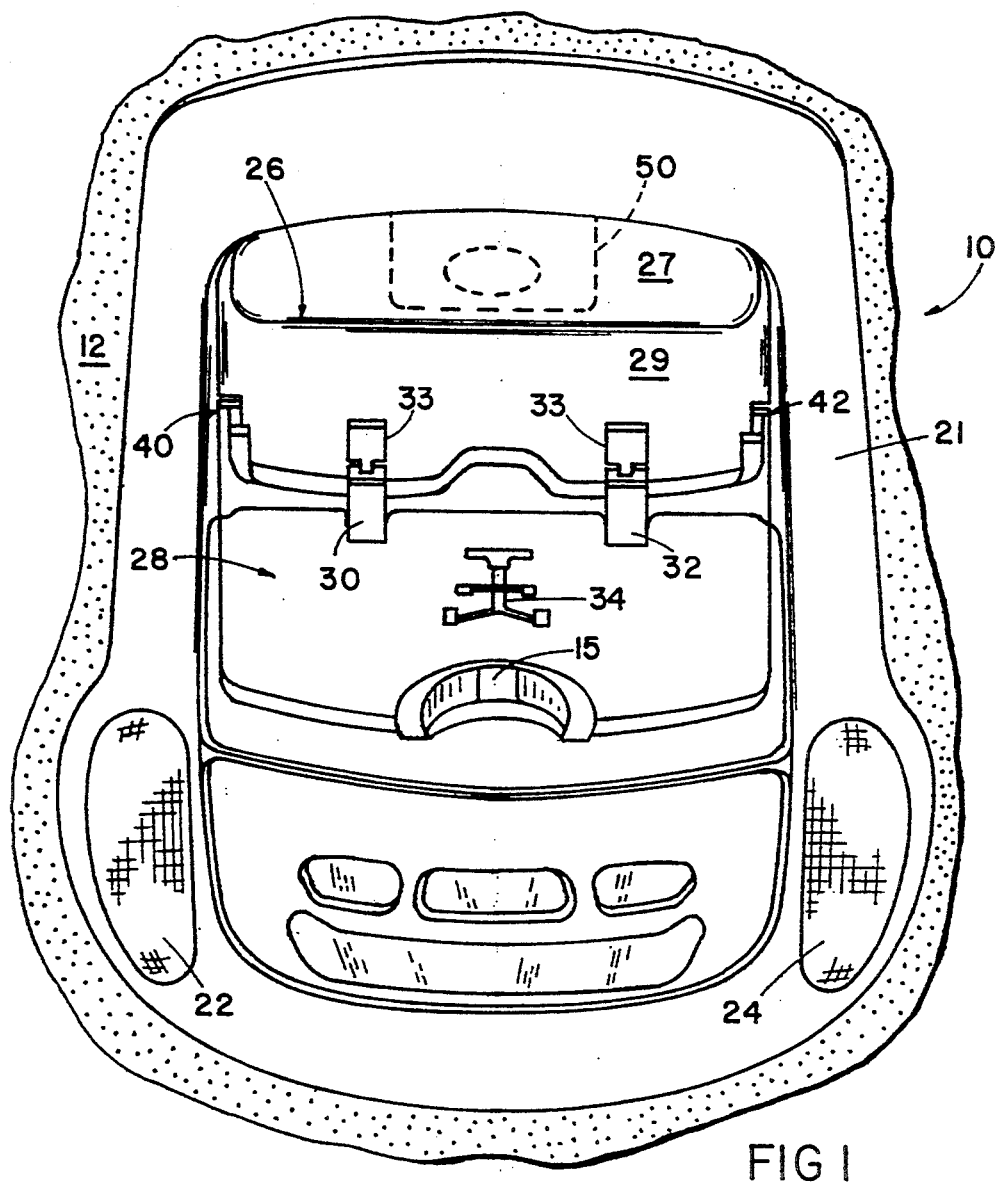
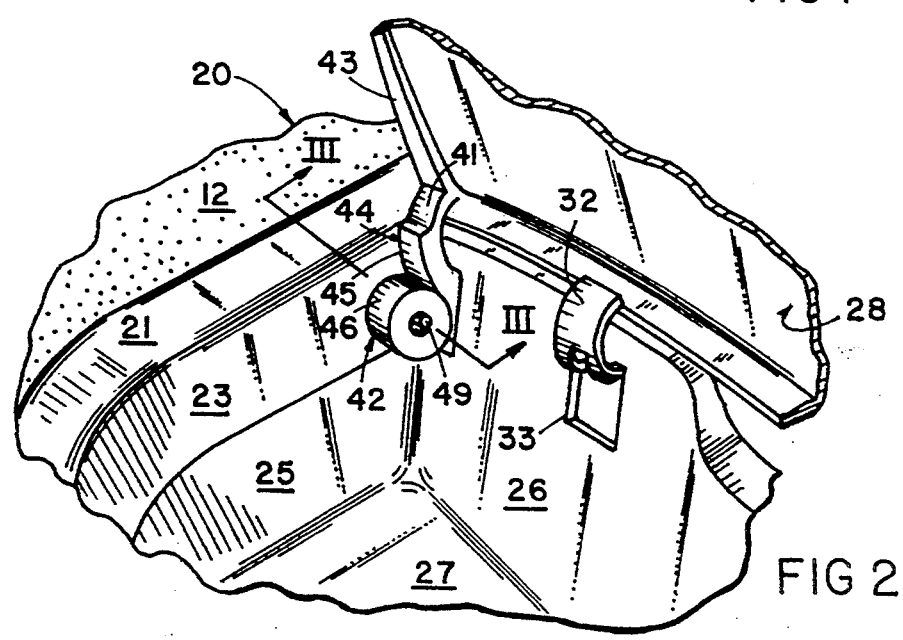
FIG 1
FIG 2

DAMPING DEVICE

BACKGROUND OF THE INVENTION

The present invention relates to a damping device and particularly one for use in connection with vehicle accessory doors.

In recent years, vehicles have included a variety of storage compartments for the convenient storage of relatively small items such as garage door openers, sunglasses, and the like. Many of these items are stored in overhead storage compartments which are centrally located in the roof area of the vehicle and which include pivot down doors. In some cases the doors integrally include pockets for receiving sunglasses or other small personal items. In order to control the movement of such doors, frequently, viscous damping devices have been employed. One popular damping device is a housing filled with a viscous damping fluid such as a silicone, in which a paddle wheel on an axle is mounted with the axle extending outwardly, terminating in an external gear. The housing is typically secured to the side of the storage compartment while a gear on the pivoted door engages the gear on the axle of the viscous damping device to slow the lowering of the door once a push button latch releases the door. For heavier doors, a pair of such viscous damping devices are used on opposite ends of the pivotally mounted door.

Although these systems provide the desired action under reasonable temperature ranges, during extreme temperatures the viscous damping devices tend to change characteristics due to the viscous damping medium changing its viscosity. As a result, these conventional viscous damping devices, which are somewhat expensive and include a relatively large number of parts, do not always function satisfactorily over temperature extremes encountered in the automotive environment.

Recently, a proposed viscous damping device has included a temperature compensating cup mounted within the viscous damping chamber to maintain the "drag" of the viscous damping device relatively constant with change in temperature. U.S. patent application Ser. No. 07/840,340 filed on Feb. 24, 1992 and entitled TEMPERATURE COMPENSATED ROTARY DAMPER discloses such a device. Although this device provides improved performance, it nonetheless utilizes a viscous damping fluid in a sealed chamber which adds to the cost and complexity of the structure.

SUMMARY OF THE INVENTION

The system of the present invention provides the same desired damping action as the improved temperature compensated viscous damping devices. However, it accomplishes this objective by utilizing an entirely different construction which eliminates the utilization of the viscous fluid which is temperature sensitive. In the system of the present invention, a first member to be moved with respect to a second member in a pivoted fashion includes an arcuate surface which engages the outer peripheral rim of an annular damping member rotatably mounted to the wall of the second member.

The annular damping member preferably is made of a compressible foam polymeric material, and in one preferred embodiment is made of an open-celled urethane foam. The annular damping member is mounted on an axle positioned to locate the annular damping member in compressible engagement with the arcuate surface of the first member. As the first member is pivoted between an open and closed position, the arcuate surface engages the outer peripheral rim of the annular damping member which in a preferred embodiment rotates with the movement of the first member through the engagement with the moving arcuate surface to provide a controlled damping action for the first member. In one embodiment the first member was a cover for the second member which was a storage compartment for an overhead vehicle console. In a preferred embodiment, the arcuate surface was configured to provide a variable resistance force as the first member moved with respect to the second member.

In a typical installation where the storage compartment door holds items such as a garage door opening transmitter, sunglasses, or the like, a pair of the damping assemblies are provided at opposite ends of the pivoted door to provide substantial control for the door even when weighted down with such items. Such construction thereby provides a relatively inexpensive damping device which does not require the utilization of a viscous damping medium and yet provides the same performance of improved temperature compensated viscous damping devices.

These and other features, objects and advantages of the present invention will become apparent upon reading the following description thereof, together with reference to the accompanying drawings in which:

BRIEF DESCRIPTION OF THE DRAWINGS

FIG. 1 is a fragmentary, perspective view of an overhead console with an accessory incorporating the damping assembly of the present invention;

FIG. 2 is an enlarged, fragmentary perspective view of the damping assembly of the present invention;

DETAILED DESCRIPTION OF THE PREFERRED EMBODIMENT

Figure 3:
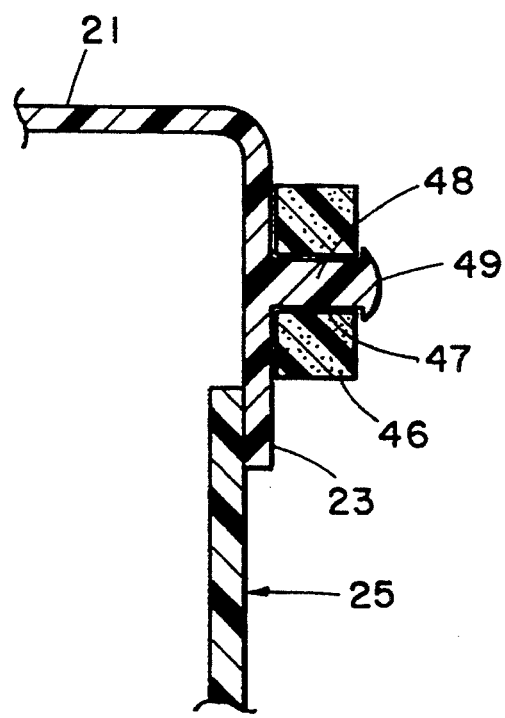
FIG. 3 is an enlarged fragmentary cross-sectional view taken along section line III—III of FIG. 2.

Referring initially to FIG. 1, there is shown a vehicle, such as an automobile, having a roof 10 which is typically covered by a headliner which may be a molded structure with an upholstered outer surface 12. Mounted to the vehicle roof 10 is an overhead console 20 that may include a variety of vehicle accessories such as a pair of map reading and courtesy lamps 22 and 24. Console 20 is typically mounted in the central forward area of the vehicle roof to be conveniently accessed by either the driver or the passenger of the vehicle. In the embodiment shown, the map lamps 22 and 24 are located at the forward facing end of the console 20 with the rear facing end including a storage compartment 26.

In the embodiment shown, a conventional, generally rectangular, garage door opening transmitter can be positioned within the storage compartment 26. The console 20 includes a peripheral bezel 21 with interior sidewalls 23 which are attached to the sides 25 of compartment 26 which also integrally includes a floor 27 and front wall 29. Door 28 is pivotally mounted to the console 20 by means of a pair of pivot arms 30 and 32 which extend within slots 33 formed in wall 29. The end of the arcuate arms 30 and 32 each include a pivot pin mounted to a suitable mounting clip (not shown) on the housing 21 to allow the cover 28 to pivot between a closed position for storing and using a garage door opener, and an open position as shown in FIG. 1 for inserting and removing a garage door opener therefrom.

The inside of door 28 includes a garage door opening actuator 34 which engages the garage door opening actuator switch for selectively operating the garage door opener when stored in the compartment 26. The door 28 thus provides three positions: the open position illustrated in FIG. 1, the closed position in which the outer surface of the door is flush with the lower surface of housing 21, and a depressed position for actuating the garage door opening transmitter. Such a garage door opening transmitter storage structure is disclosed in U.S. Pat. No. 4,595,228. The actuating member 34 is adjustable to accommodate a large variety of different garage door opening transmitters.

The floor 27 of the compartment 26 may include a VELCRO fastening device with the garage door opening transmitter being supplied with a matching fastening device for holding the garage door opener 50 in a predetermined position in compartment 26. The compartment door 28 is controlled in its movement between an open and closed position by a pair of damping devices embodying the present invention with the first device 40 being positioned on the left side of the console as seen in FIG. 1, and a second device 42 being positioned on the right side of the housing, as also seen in FIG. 1 These devices are substantially identical so only a description of device 42 is described in connection with FIG. 2.

The outer edge 43 of cover 28 includes an integrally formed arcuately curved arm 44 with an outer arcuate surface 45 which compressibly engages an annular member which in the preferred embodiment is a foam polymeric roller 46 rotatably mounted to the inner sidewall 23 by an axle 48. Axle 48 is integral with the bezel wall 23 and extends outwardly therefrom and has an outer end cap 49 as best seen in FIG. 3. to hold the roller 46 in position one the resilient roller is force fitted over the cap. For such purpose roller has a central aperture 47 with a diameter which allows its free rotation on axle 48. Arm 44 may include a recessed area 41 (FIG. 2) which allows the cover to free fall a short distance when the cover latch 15 (FIG. 1) is released for assisting in opening of the cover for access to the compartment. Also, the radius of curvature of arm 44 may vary along its length to provide a greater or lesser amount of torque resistance or "feel" as the door is moved. Also, the end of arm 44 opposite recess 41 may also be recessed selectively to provide a detent for the cover when in an open position.

Axle 48 extends in parallel spaced relationship to the pivot axis of the cover 28 such that movement of the cover causes the arcuate arm 44 to maintain a substantially constant distance from the axle 48 of the roller 46. Roller 46 is an annular member having a central aperture slightly larger than the diameter of the pivot axle 48 such that it can rotate about the hub end 49 when engaged by arcuate surface 45 of arm 44.

In the preferred embodiment of the invention, the annular roller 46 is made of a foam polymeric material and preferably a closed cell urethane foam such a PORON 4701-12 having a durameter hardness of from approximately 12 to 20. The compressive force between the arcuate arm 44 and roller 46 is approximately 4½–5½ pounds compressing the roller about 3 millimeters. The diameter of the roller 46 in the preferred embodiment is approximately ½ inch while the arcuate arm 44 has a radius of curvature of approximately 1 inch.

With the damping device 42 and the substantially identical device on the opposite side of door 28, as the doors move between an open and closed position, the compression and rotation of the foam polymeric roller 46 creates a predetermined constant drag on the door for controlling its movement irrespective of the ambient temperature of the vehicle. The damping devices 40 and 42 shown in the preferred embodiment of the invention can be equally applied to other vehicle accessory doors such as glove compartment doors, sunglass storage doors, or the like where controlled movement is desired. As can be appreciated, the structure of this invention provides a relatively inexpensive damping device in which an arcuate surface is provided on a movable member with an adjacent, aligned stationary member including a roller formed thereon for engaging the arcuate surface. If desired, this mounting arrangement can be reversed with the sidewall 23 of the console including an integrally molded arcuate surface, and the pivoted door 28 including a roller position to engage the arcuate surface on the stationary member.

Figure 4:
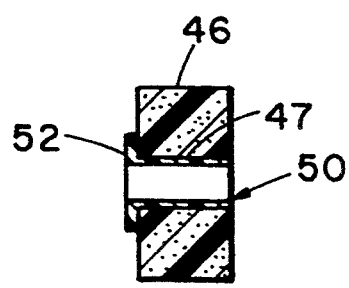
FIG. 4 is a cross-sectional view of an alternative annular member which may be used.

In the embodiment of FIG. 4, a NYLON bushing 50 with a flange 52 is inserted into aperture 47 of roller which is then placed over a smooth cylindrical axle 48 heat staked at the end 49 for holding the roller in place. The bushing assists in the easy rotation of the roller as it interacts with arm 44 while the flange 52 spaces the roller from wall 23, prevents sticking and squeaking of the roller and also assists in the free rotation of the roller.

These and other modifications to the preferred embodiment will become apparent to those skilled in the art and will fall within the spirit and scope of the invention as defined by the appended claims.

The embodiments of the invention in which an exclusive property or privilege is claimed are defined as follows:

1. A damping device for a movable element of the vehicle accessory comprising:
   a first member having one of an arcuate surface and compressible roller made of a foam polymeric material; and
   a second member having the other of an arcuate surface and compressible roller mounted thereto with said roller and arcuate surface positioned in spaced relationship with respect to one another as said first and second members are moved with respect to one another to provide a controlled drag force as the arcuate surface engages the roller during movement of said first member with respect to said second member; wherein said first member includes a wall of a storage compartment and said second member comprises a door for said storage compartment, and wherein said wall includes an axle extending outwardly therefrom and said roller is rotatably mounted on said axle.

2. The damping device as defined in claim 1 wherein said door is pivotally mounted to said storage compartment and includes an arcuate arm with said arcuate surface for engaging the periphery of said roller.

3. The damping device as defined in claim 2 wherein said roller is annular.

4. A damping device for a movable element of the vehicle accessory comprising:
   a first member having one of an arcuate surface and compressible roller; and a second member having the other of an arcuate surface and compressible roller mounted thereto with said roller and arcuate surface positioned in spaced relationship with respect to one another as said first and second members are moved with respect to one another to provide a controlled drag force as the arcuate surface engages the roller during movement of said first member with respect to said second member; wherein said first member includes a wall of a storage compartment and said second member comprises a door for said storage compartment, and wherein said wall includes an axle extending outwardly therefrom and said roller is rotatably mounted on said axle, wherein said door is pivotally mounted to said storage compartment and includes an arcuate arm with said arcuate surface for engaging the periphery of said roller, and wherein said roller is annular and is made of a foam polymeric material.

5. A vehicle storage compartment including a pivoted door and a damping device comprising:
   a member coupled to said door and including a curved surface; and
   a roller member mounted on an axle extending from a wall of said storage compartment in parallel spaced relationship with the pivot axis of said door, said roller including an outer peripheral rim engaging said curved surface with a predetermined force to provide a controlled resistance force to the movement of said door, wherein said roller is made of a compressible foam polymeric material.

6. A vehicle storage compartment including a pivoted door and a damping device comprising:
   a member coupled to said door and including a curved surface; and
   a roller member mounted on an axle extending from a wall of said storage compartment in parallel spaced relationship with the pivot axis of said door, said roller including an outer peripheral rim engaging said curved surface with a predetermined force to provide a controlled resistance force to the movement of said door, wherein said roller is made of a compressible material, wherein said roller comprises an annular member made of a foam polymeric material.

7. The structure as defined in claim 6 wherein said foam polymeric material comprises a closed cell urethane foam.

8. A damping device for a vehicle storage compartment including a pivoted door, said damping device comprising:
   a member including an arcuate surface formed on one of said pivoted door and said compartment, said arcuate surface having a center of curvature aligned with the pivot axis of said pivoted door; and
   a roller member mounted on an axle extending from the other of said pivoted door and said compartment in parallel spaced relationship with the pivot axis of said door, said roller including an outer peripheral rim engaging said arcuate surface with a predetermined force to provide a controlled resistance force to the movement of said door, wherein said roller is made of a compressible foam polymeric material.

9. The damper as defined in claim 8 wherein said roller is mounted to a wall of said storage compartment and said arcuate surface is the outer surface of an arcuate arm mounted to said door.

10. A damping device for a vehicle storage compartment including a pivoted door, said damping device comprising;
    a member including an arcuate surface formed on one of said pivoted door and said compartment, said arcuate surface having a center of curvature aligned with the pivot axis of said pivoted door; and
    a roller member mounted on an axle extending from the other of said pivoted door and said compartment in parallel spaced relationship with the pivot axis of said door, said roller including an outer peripheral rim engaging said arcuate surface with a predetermined force to provide a controlled resistance force to the movement of said door, wherein said roller is made of a compressible material, wherein said roller comprises an annular member made of a foam polymeric material.

11. The damper as defined in claim 10 wherein said foam polymeric material comprises a closed cell urethane foam.

* * * * *